United States Patent
Longoria et al.

(10) Patent No.: US 12,372,990 B2
(45) Date of Patent: Jul. 29, 2025

(54) PRESSURE REGULATORS WITH ADJUSTABLE BOOST BODIES

(71) Applicant: Emerson Process Management Regulator Technologies, Inc., McKinney, TX (US)

(72) Inventors: Ruben Longoria, Little Elm, TX (US); James C. Hawkins, Allen, TX (US); Andrew Da Costa, Plano, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 0 days.

(21) Appl. No.: 18/475,985

(22) Filed: Sep. 27, 2023

(65) Prior Publication Data

US 2024/0361788 A1     Oct. 31, 2024

Related U.S. Application Data

(60) Provisional application No. 63/498,970, filed on Apr. 28, 2023.

(51) Int. Cl.
    *G05D 16/06*      (2006.01)

(52) U.S. Cl.
    CPC .............................. *G05D 16/0688* (2013.01)

(58) Field of Classification Search
    CPC ............... G05D 16/0688; G05D 16/02; G05D 16/0694; G05D 16/063; G05D 16/0683;
(Continued)

(56) References Cited

U.S. PATENT DOCUMENTS

| | | | | |
|---|---|---|---|---|
| 3,086,548 A | * | 4/1963 | Galiger | ................. G05D 16/02 |
| | | | | 239/602 |
| 4,491,149 A | | 1/1985 | Trinkwalder | |

(Continued)

FOREIGN PATENT DOCUMENTS

FR      2466800 A1 *   4/1981

OTHER PUBLICATIONS

United States Patent and Trademark Office, "Notice of Allowance," issued in connection with U.S. Appl. No. 18/355,845, dated Apr. 10, 2024, 8 pages.
(Continued)

*Primary Examiner* — Jessica Cahill
(74) *Attorney, Agent, or Firm* — Hanley, Flight & Zimmerman, LLC

(57) ABSTRACT

Pressure regulators with adjustable boost bodies are described herein. An example pressure includes a valve body defining a fluid passageway and an actuator casing coupled to the valve body, the actuator casing defining a pressure sense chamber and a channel between the pressure sense chamber and the fluid passageway in the valve body. The pressure regulator includes a plug assembly including a stem, a plug, and a stem guide. The stem guide has a flange with a notch. The plug assembly includes a boost body and a tube extending through the boost body. A first end of the tube is aligned with the notch and a second end of the tube is disposed in a downstream location relative to the seat such that the pressure sense chamber is in fluid communication with the downstream location. The boost body is rotatable with respect to the stem guide.

18 Claims, 9 Drawing Sheets

(58) Field of Classification Search
CPC ............ G05D 16/103; Y10T 137/7809; Y10T 137/7812; Y10T 137/7818; Y10T 137/7819; Y10T 137/7831; Y10T 137/7801; F16K 31/165
See application file for complete search history.

(56) References Cited

U.S. PATENT DOCUMENTS

| | | | | |
|---|---|---|---|---|
| 4,715,232 | A * | 12/1987 | Buettner | G01F 1/375 137/592 |
| 4,754,778 | A | 7/1988 | Duffy | |
| 5,313,980 | A * | 5/1994 | Carlson | G05D 23/023 73/201 |
| 5,622,207 | A * | 4/1997 | Frank | E03B 7/12 137/561 A |
| 8,240,327 | B2 | 8/2012 | Hawkins | |
| 8,281,803 | B2 * | 10/2012 | Mevius | G05D 16/0694 137/505.46 |
| 9,354,639 | B2 | 5/2016 | Fan | |
| 9,678,516 | B2 | 6/2017 | Fan et al. | |
| 10,001,785 | B2 | 6/2018 | Sanders | |
| 10,168,717 | B2 | 1/2019 | Lin et al. | |
| 10,247,320 | B2 | 4/2019 | Zhou | |
| 2009/0261281 | A1 | 10/2009 | Mevius et al. | |
| 2010/0071786 | A1 * | 3/2010 | Hawkins | F16K 17/32 137/485 |
| 2011/0174381 | A1 * | 7/2011 | Foust | G05D 16/02 137/1 |
| 2013/0228240 | A1 | 9/2013 | Noceti | |
| 2013/0255791 | A1 | 10/2013 | Nashery | |
| 2014/0083530 | A1 | 3/2014 | Fan | |
| 2014/0090727 | A1 | 4/2014 | Nguyen et al. | |
| 2015/0234395 | A1 | 8/2015 | Fan et al. | |
| 2015/0345654 | A1 | 12/2015 | Carmen et al. | |
| 2016/0069469 | A1 | 3/2016 | Sanders | |
| 2018/0046204 | A1 | 2/2018 | Lin et al. | |
| 2020/0133317 | A1 * | 4/2020 | Wang | G05D 16/0691 |

OTHER PUBLICATIONS

European Patent Office, "Extended European Search Report," issued in connection with European Patent Application No. 24172263.6-1201, mailed on Sep. 25, 2024, 8 pages.
International Searching Authority, "Written Opinion," issued in connection with International Patent Application No. PCT/US2022/035144, mailed on Oct. 11, 2022, 6 Pages.
International Searching Authority, "International Search Report," issued in connection with International Patent Application No. PCT/US2022/035144, mailed on Oct. 11, 2022, 3 Pages.
United States Patent and Trademark Office, "Non-Final Office Action," issued in U.S. Appl. No. 17/459,142, dated Feb. 13, 2023, 13 pages.
United States Patent and Trademark Office, "Notice of Allowance and Fee(s) Due," issued in connection with U.S. Appl. No. 17/459,142, dated Mar. 22, 2023, 8 pages.
United States Patent and Trademark Office, "Non-Final Office Action," issued in connection with U.S. Appl. No. 18/355,845, dated Feb. 9, 2024, 14 pages.
International Searching Authority, "International Preliminary Report on Patentability," issued in connection with PCT No. PCT/US2022/035144, dated Mar. 7, 2024, 8 pages.
United States Patent and Trademark Office, "Non-Final Office Action," issued in connection with U.S. Appl. No. 18/584,510, dated Jan. 29, 2025, 17 pages.
European Patent Office, "Communication pursuant to Article 94(3) EPC," issued in connection with European Patent Application No. 22 748 124.9, dated Dec. 19, 2024, 5 pages.
Canadian Intellectual Property Office, "Examiner Requisition," issued in connection with Canadian Patent Application No. 3,229,947, dated Mar. 11, 2025, 4 pages.
European Patent Office, "Communication pursuant to Article 94(3) EPC," issued in connection with European Patent Application No. 22 748 124.9, dated Apr. 7, 2025, 6 pages.
United States Patent and Trademark Office, "Notice of Allowance and Fee(s) Due," issued in connection with U.S. Appl. No. 18/584,510, dated May 19, 2025, 8 pages.

* cited by examiner

PRESSURE REGULATORS WITH ADJUSTABLE BOOST BODIES

RELATED APPLICATION

This patent claims the benefit of U.S. Provisional Patent Application No. 63/498,970, titled "Pressure Regulators with Adjustable Boost Bodies," filed Apr. 28, 2023. U.S. Provisional Patent Application No. 63/498,970 is hereby incorporated by reference in its entirety. Priority to U.S. Provisional Patent Application No. 63/498,970 is hereby claimed.

FIELD OF THE DISCLOSURE

This disclosure relates generally to process control devices and, more particularly, to pressure regulators with adjustable boost bodies.

BACKGROUND

Pressure regulators, sometimes referred to as fluid regulators, are commonly distributed throughout process control systems to control flow rates and/or pressures of various fluids (e.g., liquids, gases, etc.). Pressure regulators can be used to regulate the pressure of a fluid to a substantially constant value. For example, a pressure regulator typically has an inlet that receives a supply of process fluid at a relatively high pressure and reduces the pressure to a lower and/or substantially constant pressure at an outlet.

SUMMARY

A pressure regulator disclosed herein includes a valve body defining a fluid passageway between an inlet and an outlet, a seat in the fluid passageway, and an actuator casing coupled to the valve body. The actuator casing defines a pressure sense chamber and a channel between the pressure sense chamber and the fluid passageway in the valve body. The pressure regulator also includes a plug assembly including a stem, a plug coupled to the stem, and a stem guide disposed in the channel of the actuator casing. The stem is moveable in the stem guide to move the plug relative to the seat. The stem guide has a first side facing the pressure sense chamber and a second side facing the fluid passageway. The stem guide has a flange with a notch. The plug assembly also includes a boost body on the second side of the stem guide and a tube extending through the boost body. The tube has a first end and a second end. The first end is aligned with the notch and the second end disposed in a downstream location relative to the seat such that the pressure sense chamber is in fluid communication with the downstream location. The boost body is rotatable with respect to the stem guide to position the tube in at least one other orientation relative to the actuator casing.

A plug assembly for a pressure regulator disclosed herein includes a stem and a plug coupled to the stem. The plug is to be moved relative to a seat in the pressure regulator to control a flow of fluid through the seat. The plug assembly includes a stem guide to be disposed in the pressure regulator between a fluid passageway and a pressure sense chamber. The stem guide has a first side to face the pressure sense chamber and a second side to face the fluid passageway. The stem guide has a flange with notches. The plug assembly also includes a boost body on the second side of the stem guide and a tube coupled to and extending through the boost body and into a first one of the notches. The boost body is moveable away from the second side of the stem guide and rotatable relative to the stem guide to position the tube in another one of the notches.

Figure 1:
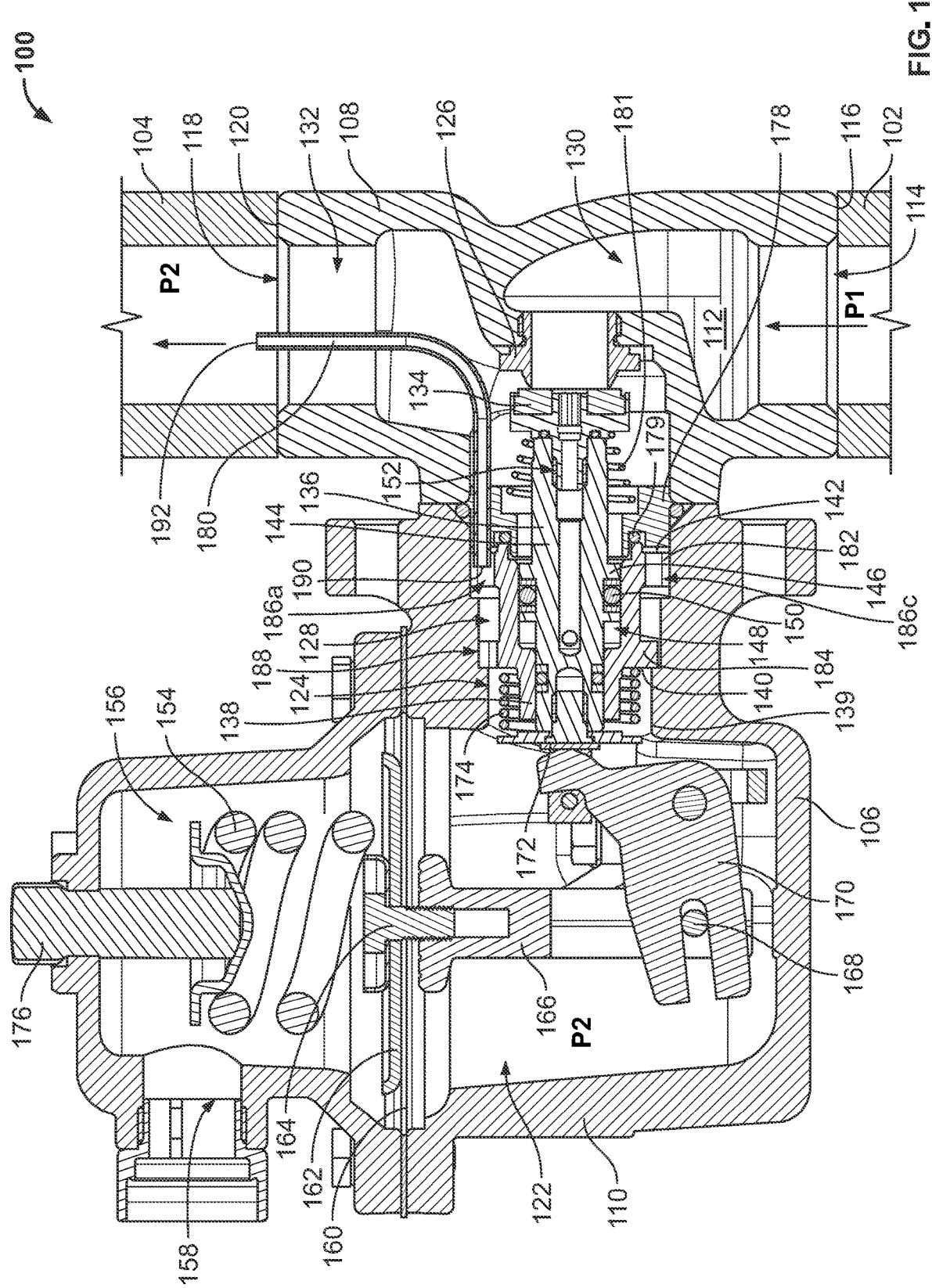
FIG. 1 is a cross-sectional view of an example pressure regulator having an example plug assembly with an example adjustable boost body constructed in accordance with the teachings of this disclosure.
Figure 2D:
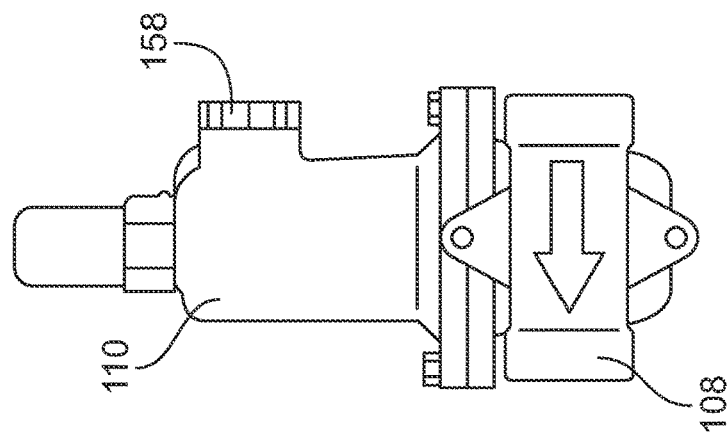
FIG. 2A-2D show the example pressure regulator of FIG. 1 with an example valve body in different orientations.
Figure 2C:
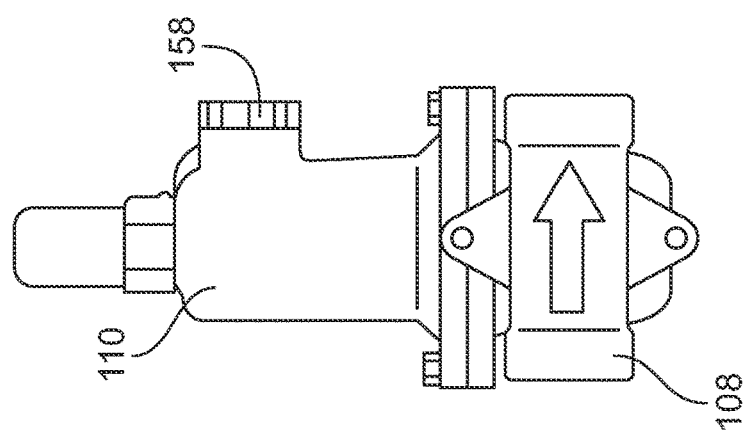
Figure 2B:
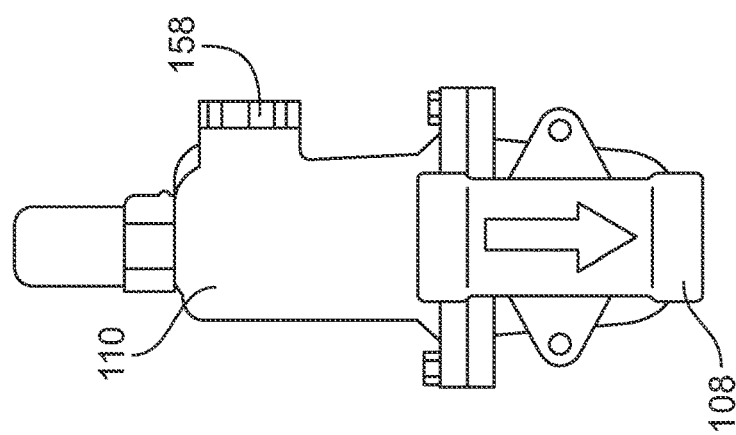
Figure 2A:
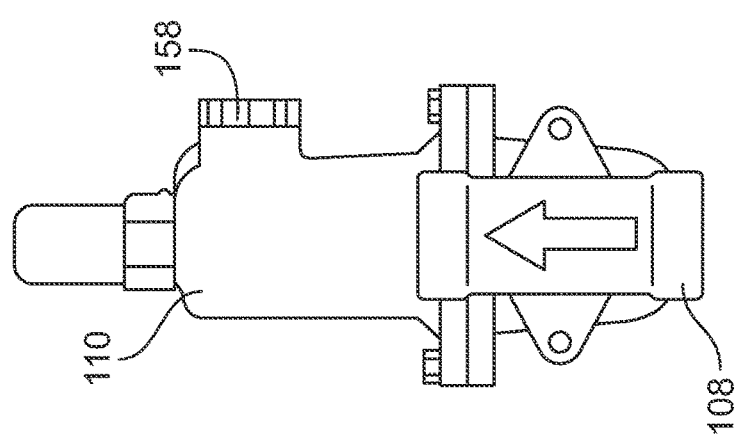

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

DETAILED DESCRIPTION

In general, pressure regulators (sometimes referred to as fluid regulators) modulate the flow of fluid in accordance with a sensed downstream pressure to maintain process system pressures within acceptable and/or constant pressure limits. Pressure regulators typically include a plug assembly having a stem guide, a stem slidably disposed in the stem guide, and a plug coupled to the stem. The stem guide is disposed in a channel formed in an actuator casing of the pressure regulator. The pressure regulator includes a valve body, which is coupled to the actuator casing, and defines a fluid passageway between an inlet and an outlet. The stem is moveable to move the plug relative to a seat in the fluid passageway to control the flow of fluid through the fluid passageway between the inlet and the outlet. Pressure regulators also include a diaphragm coupled to the stem. The diaphragm separates a pressure sense chamber from a control chamber. The pressure sense chamber is fluidly coupled to and receives fluid from a downstream point. The stem is disposed between the pressure sense chamber and the fluid passageway. The diaphragm moves in response to a difference in force between a force exerted by the pressure of the fluid in the pressure sense chamber (from the sensed downstream point) and the control chamber (e.g., set via a spring). Movement of the diaphragm causes the plug to move away from or toward the seat to allow or restrict the flow of fluid through the fluid passageway and, thus, between the inlet and the outlet of the pressure regulator.

In some examples, the pressure sense chamber is fluidly coupled by a boost body to a location in the fluid passageway that is immediately downstream of the seat in the valve body of the pressure regulator. This is often referred to as an internal sense pressure regulator. However, the pressure in this location is often relatively high, even when the pressure regulator is closed. This can cause a delay in opening the pressure regulator. As such, the pressure regulator may not quickly respond to changes in pressure.

Disclosed herein are example plug assemblies that include a tube (e.g., a pitot tube) that extends through the boost body and is aligned with a notch in a flange of the stem guide. The tube forms a passageway that places the pressure sense chamber in fluid communication with a point that is further downstream in the fluid passageway. Therefore, the pressure sense chamber senses pressure that is further downstream of the seat than known boost bodies. This location further downstream has a lower pressure, which enables the pressure regulator to open more quickly to account for mechanical droop of the regulator.

In some examples, the tube includes a curved portion that forms a 90° turn or bend, which enables the tube to extend relatively far down the center of the fluid passageway downstream of the seat. In some examples, the boost body is adjustable to change the direction that the tube curves relative to the actuator casing. This enables the actuator casing and the valve body to be coupled at different orientations and so that the tube can still extend down the middle of the downstream portion of the valve body. In some examples, the stem guide has multiple notches, and the boost body can be rotated to align the tube with the different notches depending on the desired orientation of the tube. Therefore, a relatively long tube can be used, while still enabling the actuator casing and the valve body to be coupled at different rotational orientations. This allows the actuator casing and valve body to be coupled at different orientations, which is desirable when installing the pressure regulator between pipes.

FIG. 1 is a cross-sectional view of an example pressure regulator 100 constructed in accordance with the teachings of this disclosure. The example pressure regulator 100 can be used to regulate and/or otherwise control the flow and/or pressure of a process fluid. The process fluid can be any type of fluid, such as natural gas, oil, water, etc. For example, FIG. 1 shows the example pressure regulator 100 installed between an upstream pipe 102 and a downstream pipe 104. The upstream pipe 102 supplies process fluid from an upstream source (e.g., a distribution facility), and the downstream pipe 104 directs the process fluid to a downstream location (e.g., a customer). The pressure regulator 100 can be used to regulate and/or control the pressure of the fluid between the upstream pipe 102 and the downstream pipe 104. For example, the pressure regulator 100 can be used to reduce the pressure from a first pressure P1 in the upstream pipe 102 to second pressure P2 in the downstream pipe 104. The downstream pressure P2 may be based on the downstream location capacity and/or demands. This prevents over-pressurization at the downstream location.

In the illustrated example of FIG. 1, the pressure regulator 100 includes a device body 106 (e.g., a casing, a housing, etc.). In this example, the device body 106 includes a valve body 108 (sometimes referred to as a regulator body or housing) and an actuator casing 110 that are coupled together (e.g., via one or more bolts). However, in other examples, the device body 106 can include more or fewer bodies or housings. In the illustrated example, the valve body 108 defines a fluid passageway 112 between an inlet 114 at a first end 116 of the valve body 108 and an outlet 118 at a second end 120 of the valve body 108. The upstream pipe 102 is coupled to the first end 116 of the valve body 108 at the inlet 114, and the downstream pipe 104 is coupled to the second end 120 of the valve body 108 at the outlet 118. In the illustrated example, the actuator casing 110 defines a pressure sense chamber 122. The actuator casing 110 also defines a channel 124 (e.g., an opening, a passageway, etc.) between the fluid passageway 112 and the pressure sense chamber 122.

In the illustrated example, the pressure regulator 100 includes a seat 126 (e.g., a seal) in the fluid passageway 112. The pressure regulator 100 also includes an example plug assembly 128. The plug assembly 128 controls the flow of fluid through the seat 126 and, thus, between the inlet 114 and the outlet 118. The seat 126 divides the fluid passageway 112 into an upstream portion 130 (upstream of the seat 126) and a downstream portion 132 (downstream of the seat 126).

In the illustrated example, the plug assembly 128 includes a plug 134 (sometimes referred to as a disc or flow control member), a stem 136, and a stem guide 138. The plug 134 is coupled to the stem 136. In the illustrated example, the stem 136 extends through the stem guide 138. The stem 136 is moveable (e.g., slidable) in the stem guide 138 to move the plug 134 toward or away from the seat 126, thereby controlling the flow of fluid through the seat 126. In particular, the plug 134 can be moved between a closed position, which is shown in FIG. 1, and an open position. In the closed position, the plug 134 is sealingly engaged with the seat 126, which prevents fluid flow through the seat 126 from the inlet 114 to the outlet 118. In the open position, the plug 134 is moved to the left in FIG. 1 such that the plug 134 is spaced from the seat 126, which allows fluid to flow through the seat 126 from the inlet 114 to the outlet 118. Therefore, the seat 126 and the plug 134 form a valve. The pressure regulator 100 is configured to move the plug 134 between the opened and closed positions to regulate the pressure of the fluid downstream.

In the illustrated example, the stem guide 138 is disposed in the channel 124 between the fluid passageway 112 and the pressure sense chamber 122. The stem guide 138 is sealed relative to the device body 106 to fluidly isolate the fluid in the fluid passageway 112 and fluid in the pressure sense chamber 122 (except for designated passages for pressure sense, disclosed in further detail herein). In some examples, the stem guide 138 is sized to form an interference fit (sometimes referred to as friction fit or press fit) with an inner surface 139 of the channel 124. Additionally or alternatively, one or more seals can be used. The stem guide 138 has a first side 140 and a second side 142 opposite the first side 140. The first side 140 faces the pressure sense chamber 122 and is exposed to the pressure sense chamber 122. The second side 142 faces the fluid passageway 112.

In this example, the example pressure regulator 100 balances the stem 136 to reduce or eliminate the influence of the pressure differential on the stem 136 and the plug 134. In the illustrated example, the stem 138 has a stem body 144 and a flange 146 extending radially from the stem body 144. The stem guide 138 and the flange 146 form a balance chamber 148. The flange 146 is sealed to an inner surface of the stem guide 138 via a seal 150. As such, the flange 146 fluidly separates the balance chamber 148 and the downstream portion 132 of the fluid passageway 112.

In the illustrated example, a balance passage 152 (which may also be referred to as a balance port) is defined through the plug 134 and the stem 136 that extends to the balance chamber 148. In particular, a portion of the balance passage 152 extends longitudinally through the stem 136, and another portion of the balance passage 152 extends in a transverse direction (e.g., into or out of the page in FIG. 1) to the outer surface of the stem 136. Upstream or inlet fluid pressure is delivered to the balance chamber 148 through the balance passage 152. Thus, upstream or inlet fluid pressure acts on the stem 136 in the balance chamber 148 to counter the upstream or inlet fluid pressure acting on the plug 134. Therefore, in this example, the balance passage 152 forms means for fluidly coupling the upstream portion 130 of the fluid passageway 112 and the balance chamber 148. In other examples, the balance passage 152 could be formed by one or more openings or channels through one or more other structures.

As shown in FIG. 1, the pressure regulator 100 includes a control spring 154. The control spring 154 is used to control or set the pressure at which the pressure regulator 100 opens and closes. The control spring 154 is disposed in a control chamber 156 in the actuator casing 110. In some examples, the control chamber 156 is open to the atmosphere via a vent opening 158. In other examples, a fluid line can be coupled to the vent opening 158 to place the control chamber 156 at a different pressure than atmosphere. In the illustrated example, the pressure regulator 100 includes a diaphragm 160 that separates the control chamber 156 and the pressure sense chamber 122. The pressure regulator 100 includes a diaphragm plate 162 that is coupled to the diaphragm 160 via a diaphragm cap screw 164. The control spring 154 is engaged with the diaphragm plate 162, which biases the diaphragm plate 162 and the diaphragm 160 toward the pressure sense chamber 122 (downward in FIG. 1). The diaphragm plate 162 is coupled to a pusher post 166 (e.g., via the diaphragm cap screw 164). The pusher post 166 includes a drive pin 168 that cooperates with a lever 170. The lever 170 is pivotably coupled to the actuator casing 110. The lever 170 is coupled to a stem pin 172 that is coupled to the stem 136. As the pusher post 166 moves up and down, the pusher post 166 rotates the lever 170, which moves the stem 136 linearly in the stem guide 138 (left and right in FIG. 1).

The pressure regulator 100 receives fluid at the inlet 114 at the first pressure P1. The pressure regulator 100 is configured to stop or reduce the flow of fluid to the outlet 118 based on pressure of fluid at a downstream point, referred to as the second pressure P2. If the pressure P2 meets or exceeds a certain pressure (which may be referred to herein as a set or trigger pressure), the pressure regulator 100 closes the fluid passageway 112, thereby regulating the pressure of the fluid at the downstream point. In the illustrated example, the pressure sense chamber 122 receives fluid from downstream of the seat 126 via a boost body and tube, as disclosed in further detail herein. Therefore, the pressure sense chamber 122 is at the second pressure P2. When the pressure P2 in the pressure sense chamber 122 reaches the set pressure, the pressure P2 overcomes the force of the control spring 154 and forces the diaphragm 160 upward in FIG. 1. As the diaphragm 160 and the diaphragm plate 162 move upward, the pusher post 166 rotates the lever 170 clockwise in FIG. 1. The lever 170 pushes the stem 136 to the right in FIG. 1, until the plug 134 engages the seat 126 to close off the fluid passageway 112, as shown in the position in FIG. 1. This reduces the pressure of the fluid at the downstream point. When the pressure P2 of the fluid in the pressure sense chamber 122 drops below the set pressure, the spring force overcomes the pressure and moves the diaphragm 160 and the diaphragm plate 162 downward. The pusher post 166 moves downward and rotates the lever 170 in the opposite direction. In some examples, the pressure regulator 100 includes a return spring 174 to bias the stem 136 back to the left in FIG. 1, such that the plug 134 moves away from the seat 126. Therefore, the set pressure is based (at least partially) on the spring force from the control spring 154. In some examples, the spring force of the control spring 154 can be increased or decreased to change the set pressure to a desired pressure level. For example, an adjustment screw 176 can be adjusted to increase or decrease the compression of the control spring 154 and, thus, change the force the control spring 154 exerts on the diaphragm 160.

As disclosed above, the pressure sense chamber 122 is fluidly coupled and/or otherwise senses pressure at a location that is downstream of the seat 126. As shown in FIG. 1, the plug assembly 128 includes a boost body 178 and a tube 180 (which may also be referred to as a pitot tube or sense tube). The boost body 178 is disposed in the channel 124 on the second side 142 of the stem guide 138. The boost body 178 is sealed against the second side 142 of the stem guide 138 by a seal 179 (e.g., an o-ring). As shown in FIG. 1, the plug assembly 128 includes a spring 181 to bias the boost body 178 toward the stem guide 138. In this example, the spring 181 is between the plug 134 and the boost body 178. In other examples, the spring 181 can be disposed in another location (e.g., between the boost body 178 and a portion of the valve body 108). In this example, the spring 181 is a conical compression spring. In other examples, the spring 181 can be implemented by another type of spring, such as a constant pitch helical compression spring. The tube 180 is coupled to the boost body 178. In the illustrated example, a portion of the tube 180 extends through the boost body 178 and into the stem guide 138. In particular, the stem guide 138 has a first flange 182 and a second flange 184. The second flange 184 is spaced from (in the axial direction) the first flange 182. The first and second flanges 182, 184 can also be referred to as discs. The first and second flanges 182, 184 are engaged (e.g., in contact) with the inner surface 139 of the channel 124. The first flange 182 has a set of notches 186a-186d (the first and second notches 186a and 186c are shown in FIG. 1) that extend into the peripheral edge of the first flange 182. The second flange 184 has a notch 188 to enable fluid flow across the second flange 184. The tube 180 has a first end 190 and a second end 192 opposite the first end 190. As shown in FIG. 1, the tube 180 extends through the boost body 178 and is aligned with the first notch 186a in the first flange 182 of the stem guide 138. In particular, in this example, the first end 190 extends into and is disposed in the first notch 186a. The second end 192 is disposed in a downstream location of the seat 126. As such, fluid from the second end 192 of the tube 180 is directed through the tube 180, through the first notch 186a, through the cavity between the stem guide 138 and the inner surface of the channel 124, and through the notch 188 in the second flange 184 of the stem guide 138 and into the pressure sense chamber 122. Therefore, the tube 180 fluidly couples the downstream location at the second end 192 of the tube 180 with the pressure sense chamber 122. As such, the pressure sense chamber 122 is at the same pressure as the fluid at the downstream location where the second end 192 of the tube 180 is located In this example, the tube 180 is curved and includes a 90° turn or bend (e.g., a rounded curve or bend). This enables the tube 180 to extend further down the fluid passageway 112 away from the seat 126. In some examples, this is advantageous because the pressure further downstream is sensed as a lower pressure. This enables the pressure regulator 100 to open faster or earlier by reducing feedback delay to account for mechanical droop of the pressure regulator 100. In known regulators, the pressure sense chamber 122 senses the pressure of the fluid right next to the seat 126. However, the pressure next to the seat 126 is higher than the pressure downstream as the pressure regulator 100 opens and allows more flow. This higher pressure keeps the pressure regulator 100 closed for longer. By extending the tube 180 further downstream, as shown in FIG. 1, the pressure sense chamber 122 can sense a lower pressure than right next to the seat 126. This enables the pressure regulator 100 to open more quickly by accounting for mechanical droop.

In some examples, the second end 192 of the tube 180 is located at or near the second end 120 of the valve body 108. In the illustrated example, the second end 192 of the tube 180 extends beyond or past the second end 120 of the valve body 108. As such, a portion of the tube 180 extends into the downstream pipe 104. In some examples, it is advantageous to sense the pressure just outside of the valve body 108, because this pressure registers as a lower pressure to achieve the benefits discussed above. However, in other examples, the tube 180 may be longer or shorter such that the tube 180 extends further into the downstream pipe 104, or the second end 192 may be in the downstream portion 132 of the fluid passageway 112.

In some examples, the valve body 108 and the actuator casing 110 can be coupled to each other in different orientations. For example, FIGS. 2A-2D show four different orientations of the valve body 108 relative to the actuator casing 110. The orientation may be chosen by an installer for a specific installation. In some examples, the desired orientation may be based on the existing pipe setup and the desired orientation of the valve body 108 and/or the actuator casing 110 relative to each other. For example, it may be desirable to orient the actuator casing 110 vertically, while the valve body 108 can be orientated to match the direction of the upstream and downstream pipes. In another example, the pressure regulator 100 may be connected to a pre-existing pipe, and it may be desirable to orient the actuator casing 110 such that the vent opening 158 is facing vertically downward, which helps prevent rain or other precipitation from falling into the vent opening 158. In this example, the valve body 108 and the actuator casing 110 can be coupled in four different orientations (e.g., at 90° increments), which may be based on a bolt pattern between the valve body 108 and the actuator casing 110.

Figure 3:
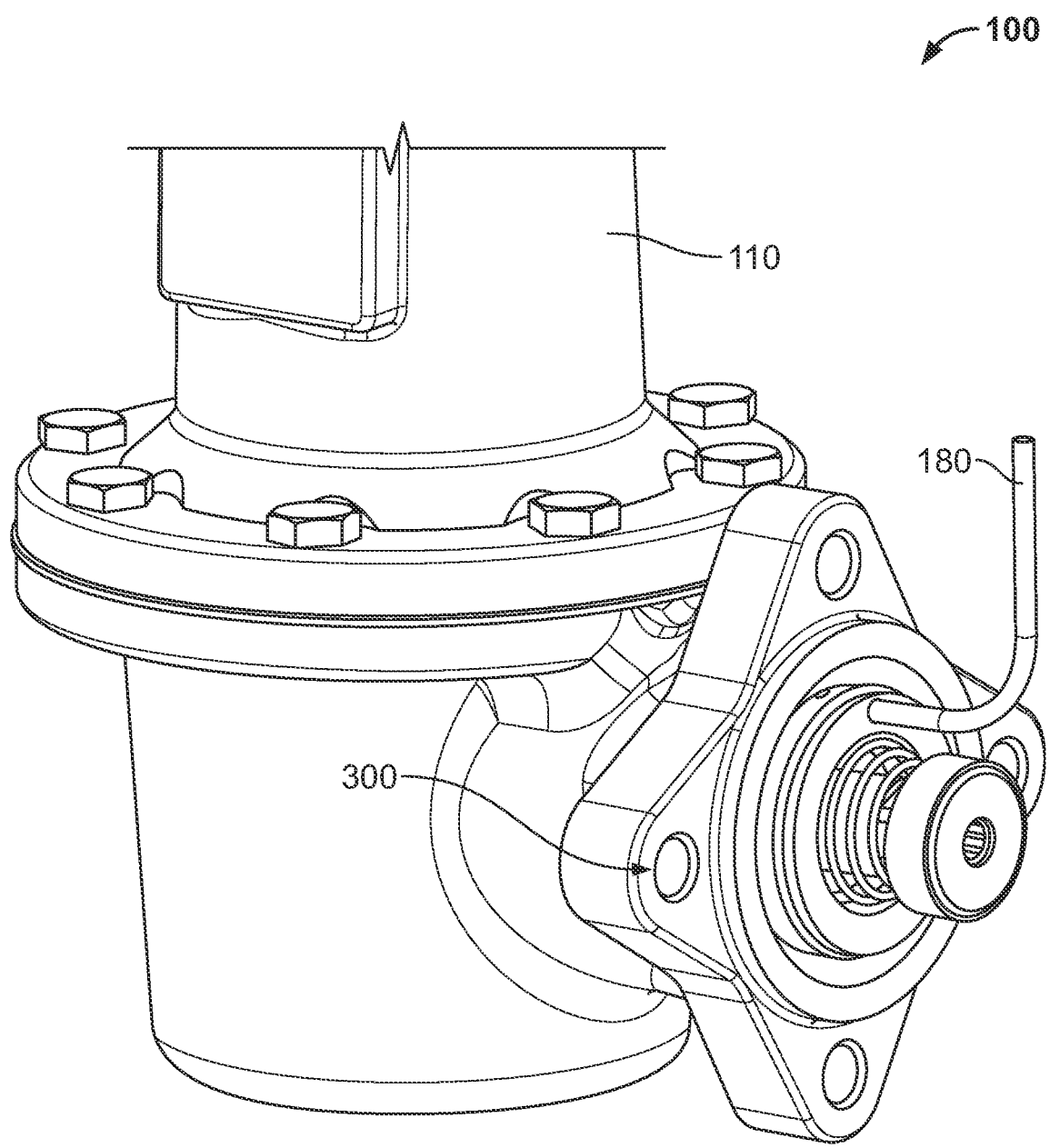
FIG. 3 is a perspective view of the example pressure regulator of FIG. 1 with the example valve body removed.

As disclosed above, the tube 180 extends in a certain direction away from the boost body 178 (e.g., upward in FIG. 1). For example, FIG. 3 is a perspective of the pressure regulator 100 with the valve body 108 removed. As shown in FIG. 3, the actuator casing 110 has four flange bolt openings 300 (one of which is referenced in FIG. 3). The valve body 108 (FIG. 1) can be coupled to the actuator casing 110 in one of four orientations (shown in FIGS. 2A-2D) based on the bolt pattern. As shown, the tube 180 is curved upward in the orientation in FIG. 3. Therefore, in order to rotate the valve body 108 to another orientation (e.g., horizontal), the tube 180 also needs to be reoriented so the tube 180 can remain centered in the downstream portion 132 (FIG. 1) of the fluid passageway 112 (FIG. 1).

Figure 4:
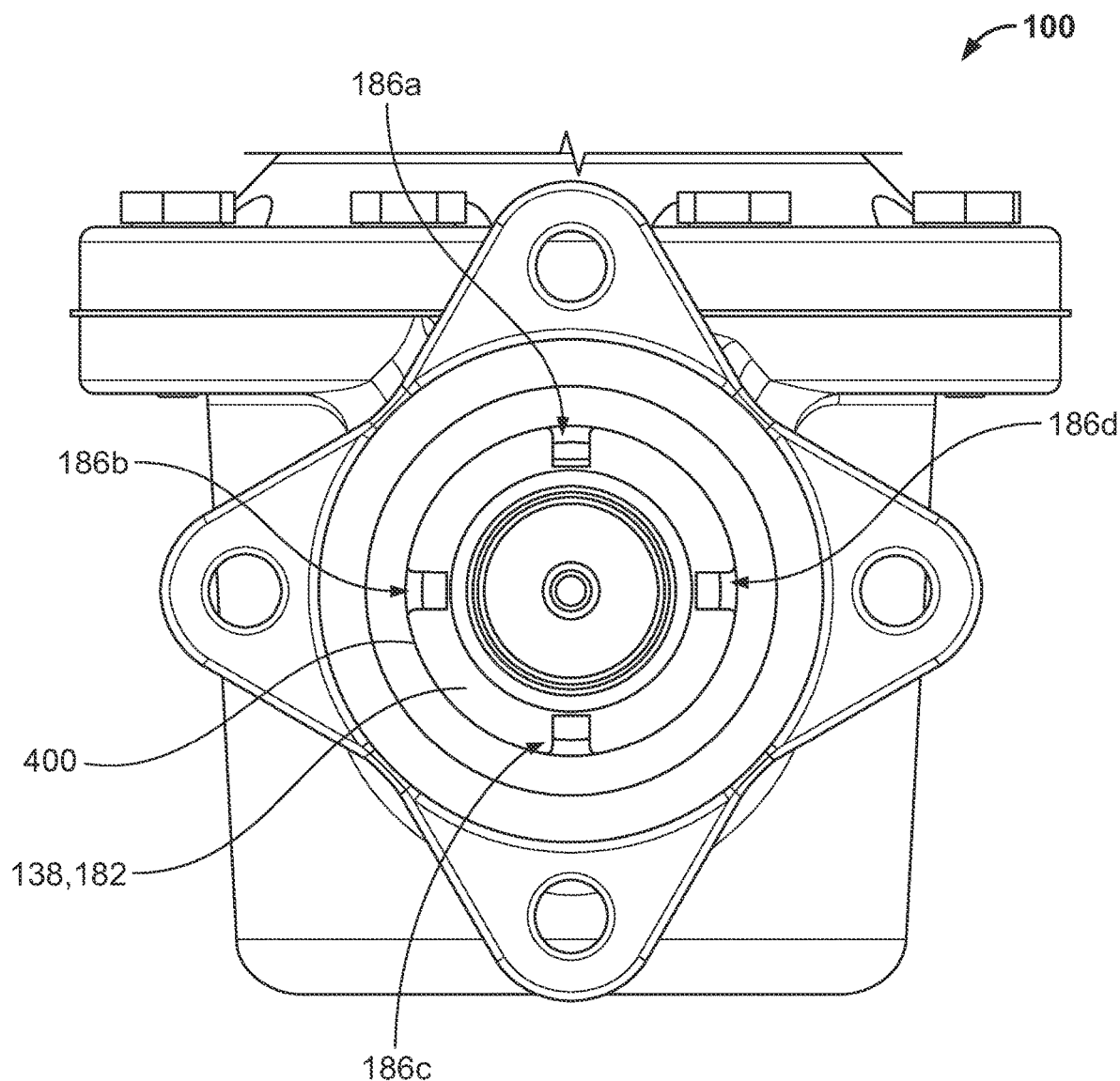
FIG. 4 is a side view of the example pressure regulator of FIG. 3 with the example boost body and an example tube removed.

FIG. 4 is a side view of the pressure regulator 100 of FIG. 3 with the boost body 178 and the tube 180 removed. As disclosed above, the first flange 182 of the stem guide 138 includes the four notches 186a-186d. This enables the tube 180 to be inserted into other ones of the notches 186a-186d depending on the desired orientation of the tube 180. Therefore, the tube 180 can be moved to other positions and/or orientations relative to the stem guide 138. In the illustrated example, the notches 186a-186d extend into a peripheral edge 400 of the first flange 182 of the stem guide 138. However, in other examples, the notches 186a-186d may instead be formed by openings (e.g., through-holes, channels) that extend through the first flange 182 and do not extend to the peripheral edge 400.

Figure 5A:
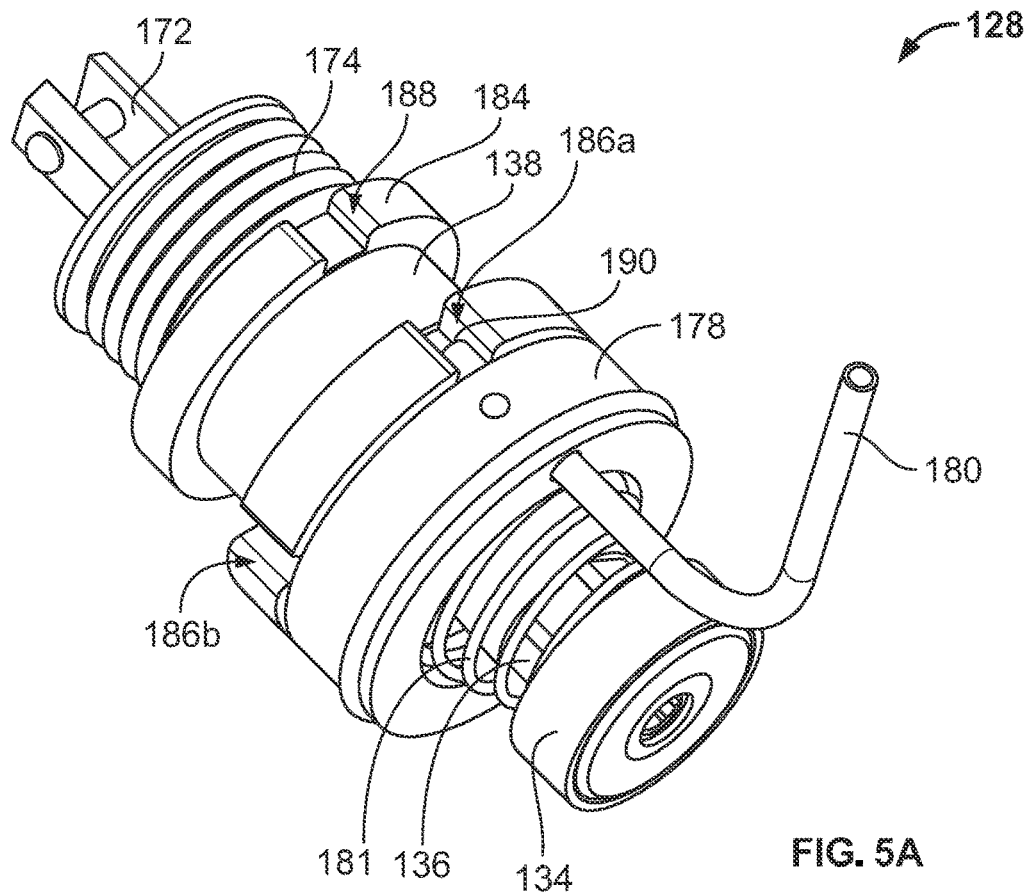
FIGS. 5A-5C are perspective views of the example plug assembly of FIG. 1 showing an example sequence of adjusting a position of the example tube of the example plug assembly.
Figure 5B:
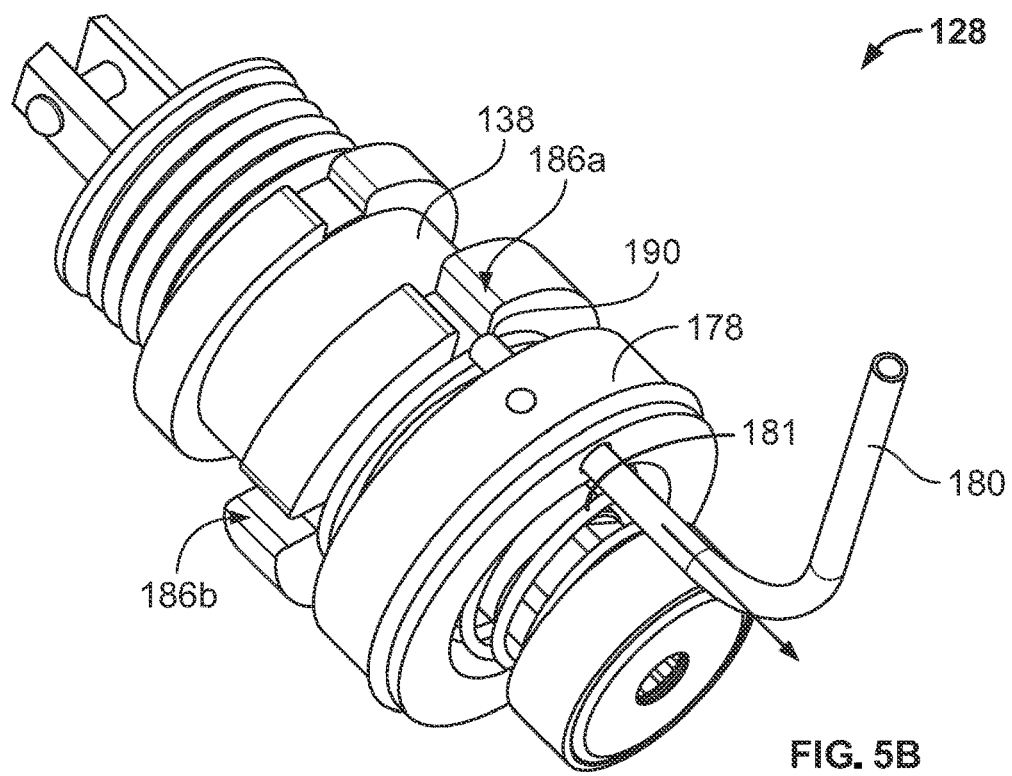
Figure 5C:
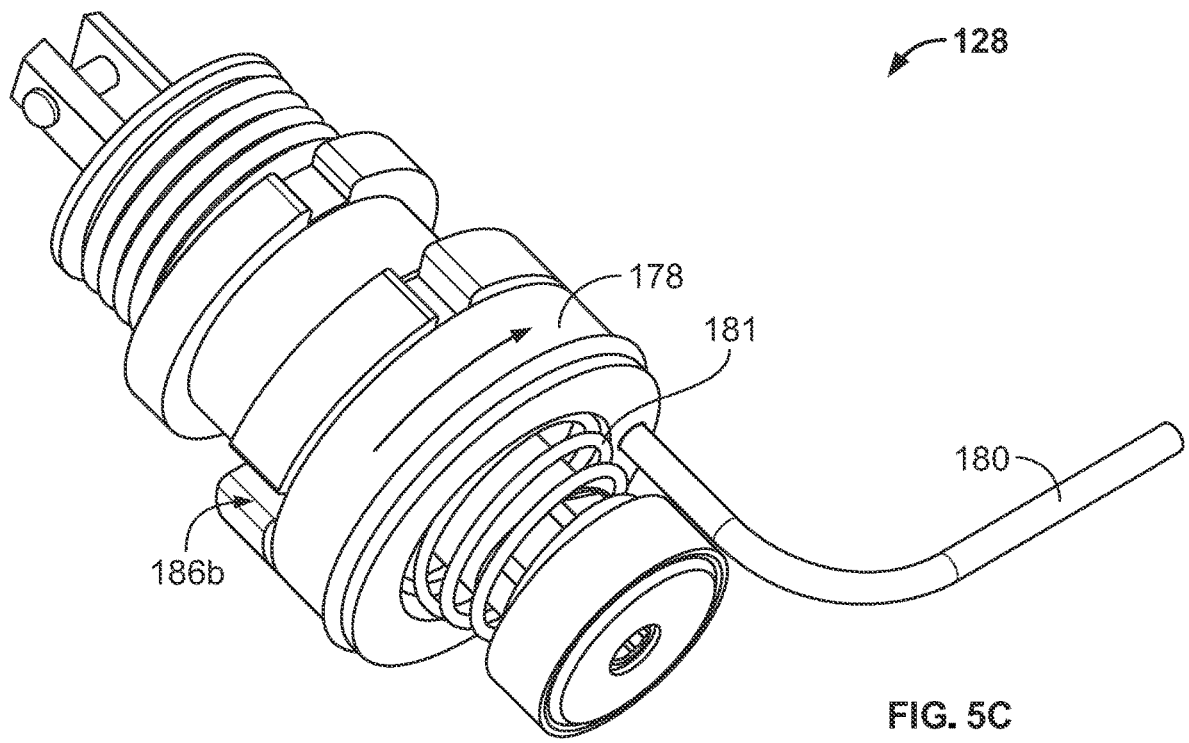

FIGS. 5A-5C are perspective views of the plug assembly 128 showing an example sequence of adjusting the orientation of the tube 180. In FIG. 5A, the boost body 178 is engaged or sealed against the stem guide 138 and the first end 190 of the tube 180 is disposed in the first notch 186a. In this position, the tube 180 extends outward and vertically upward. Also shown and labeled in FIG. 5A are the notch 188 in the second flange 184 of the stem guide 138, the return spring 174, the stem 136, the stem pin 172, and the plug 134.

To change the orientation of the boost body 178 and the tube 180, the boost body 178 can be moved away from the stem guide 138, against the bias of the spring 181. For example, as shown in FIG. 5B, the boost body 178 can be pulled linearly away (in the direction of the arrow) from the stem guide 138 such that the first end 190 of the tube 180 is moved out of the first notch 186a. In some examples, an installer (e.g., a person) can manually pull the boost body 178 away from the stem guide 138. Then, as shown in FIG. 5C, the boost body 178 with the tube 180 can be rotated (e.g., clockwise or counter-clockwise) to align the tube 180 with another notch 186b-186d. When the tube 180 is in the desired orientation and aligned with one of the notches 186a-186d, the boost body 178 can be released, and the spring 181 biases the boost body 178 toward the stem guide 138 such that the first end 190 of the tube 180 is inserted into the corresponding notch. The spring 181 ensures the parts stay together as intended by the installer during installation. Therefore, the boost body 178 is rotatable with respect to the stem guide 138 to position the tube 180 in at least one other orientation relative to the actuator casing 110 (FIG. 1). In this example, the boost body 178 and the tube 180 can be rotated to one of four positions or orientations to align the first end 190 of the tube 180 with one of the four notches 186a-186d. In this example, a portion of the tube 180 the extends into the corresponding notch 186a-186d. Therefore, the tube 180 acts as a locating or indicating pin to align the tube 180 in one of the four positions. Once the tube 180 is in the desired orientation, the valve body 108 (FIG. 1) can be installed on the actuator casing 110 (FIG. 1) (or vice versa). As such, the orientation of the tube 180 can be changed while the plug assembly 128 remains in the channel 124 of the actuator casing 110.

In this example, the four notches 186a-186d are radially spaced apart from each other around the first flange 182. In particular, in this example, the notches 186a-186d are spaced 90° apart from each other. As such, the tube 180 can be rotated and positioned at one of four different rotational positions that are 90° apart. These four rotational positions correspond to the rotational positions that the valve body 108 and the actuator casing 110 can be coupled, as shown in FIGS. 2A-2D. However, in other examples, the stem guide 138 can include more or fewer notches and/or the notches can be spaced apart at other increments (e.g., 6 notches spaced apart at 60° increments).

In some examples, the plug assembly 128 is sized and shaped to fit in existing pressure regulators. Therefore, old plug assemblies can be removed and replaced with the example plug assembly 128 with the tube 180.

Figure 6:
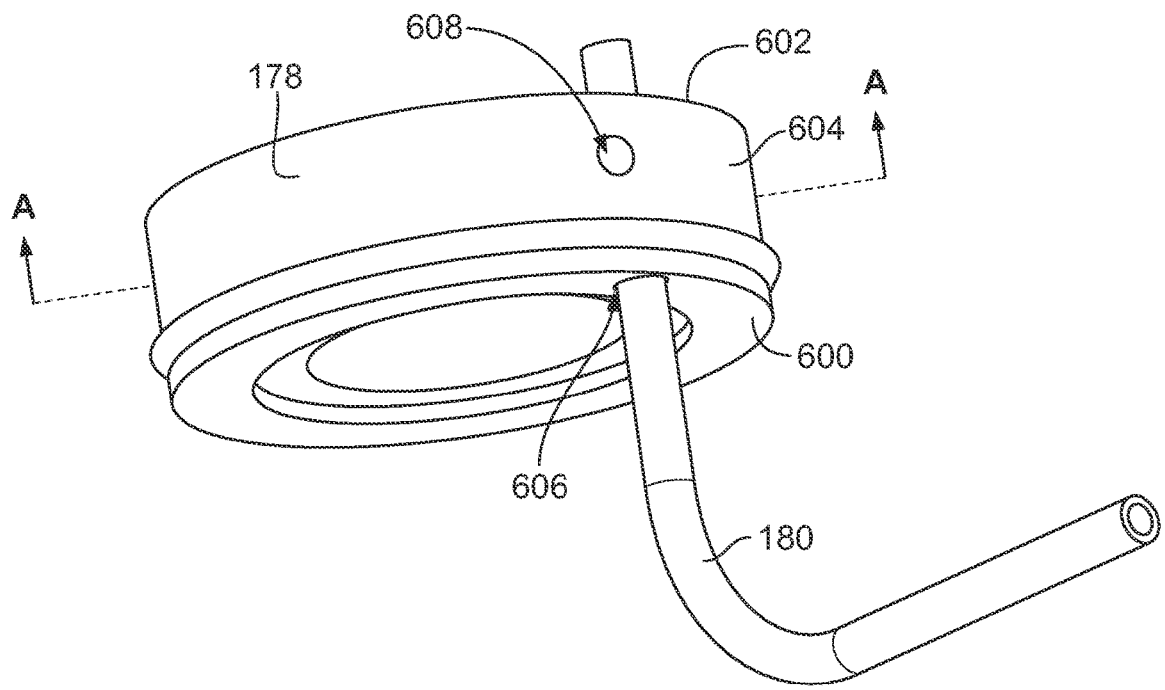
FIG. 6 is a perspective view of the example boost body and the example tube of the example plug assembly of FIG. 1.

FIG. 6 is a perspective view of the boost body 178 and the tube 180. The boost body 178 has a first side 600, a second side 602, and a peripheral edge 604 between the first side 600 and the second side 602. The tube 180 is coupled to extends through a channel 606 formed between the first and second sides 600, 602 of the boost body 178. In some examples, the tube 180 and the channel 606 may be dimensioned such that the tube 180 fits snuggly (e.g., forms an interference fit (sometimes referred to as a friction fit or press fit)) within the channel 606 to prevent fluid leaking through the channel 606. For example, the diameter of the tube 180 may be larger than the diameter of the channel 606 prior to insertion into the channel 606. In some examples, the boost body 178 is constructed of a compliant material, such as rubber, and the tube 180 is constructed of metal, such as stainless steel.

Figure 7:
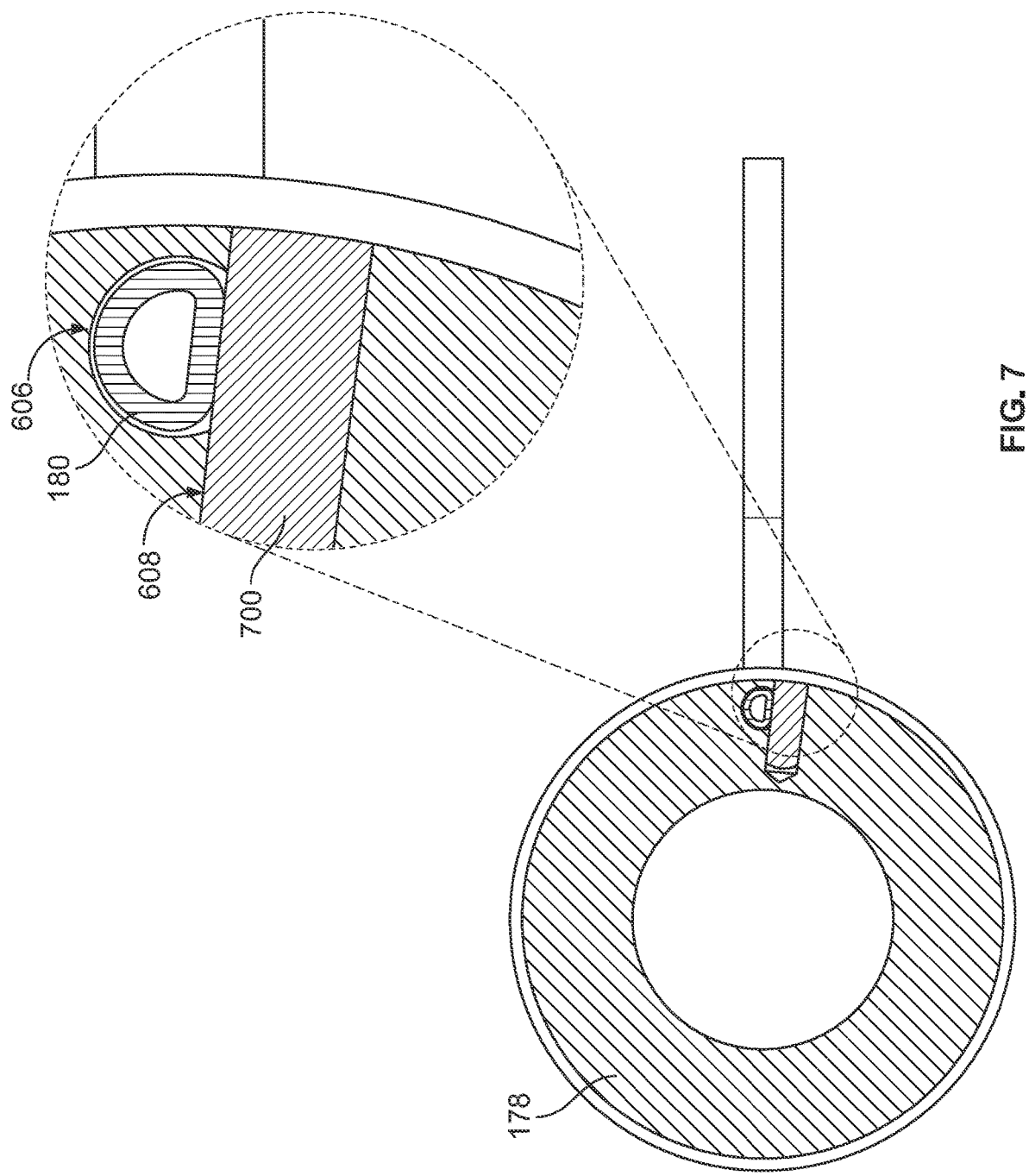
FIG. 7 is a cross-sectional view taken along line A-A of FIG. 6.

In this example, the tube 180 is coupled to the boost body 178 by a retaining pin. For example, FIG. 6 shows a bore 608 extending into the peripheral edge 604 of the boost body 178. The bore 608 partially intersects the channel 606. For example, FIG. 7 is a cross-sectional view of the boost body 178 taken along line A-A of FIG. 6. As shown in the callout in FIG. 7, a pin 700 is inserted into the bore 608. When the pin 700 is inserted into the bore 608, the pin 700 partially crushes or flattens a portion of the tube 180, as shown in the callout. This locks and/or otherwise prevents the tube 180 from being pulled out of the boost body 178. To remove the tube 180 from the boost body 178, the pin 700 is removed first, and then the tube 180 can be slid outward from the channel 606. In other examples, the tube 180 can be coupled to the boost body 178 via other techniques (e.g., a clamp, a threaded fastener). Further, in some examples, the boost body 178 and the tube 180 can be constructed (e.g., machined) as a single unitary part or component (e.g., a monolithic structure).

Figure 8:
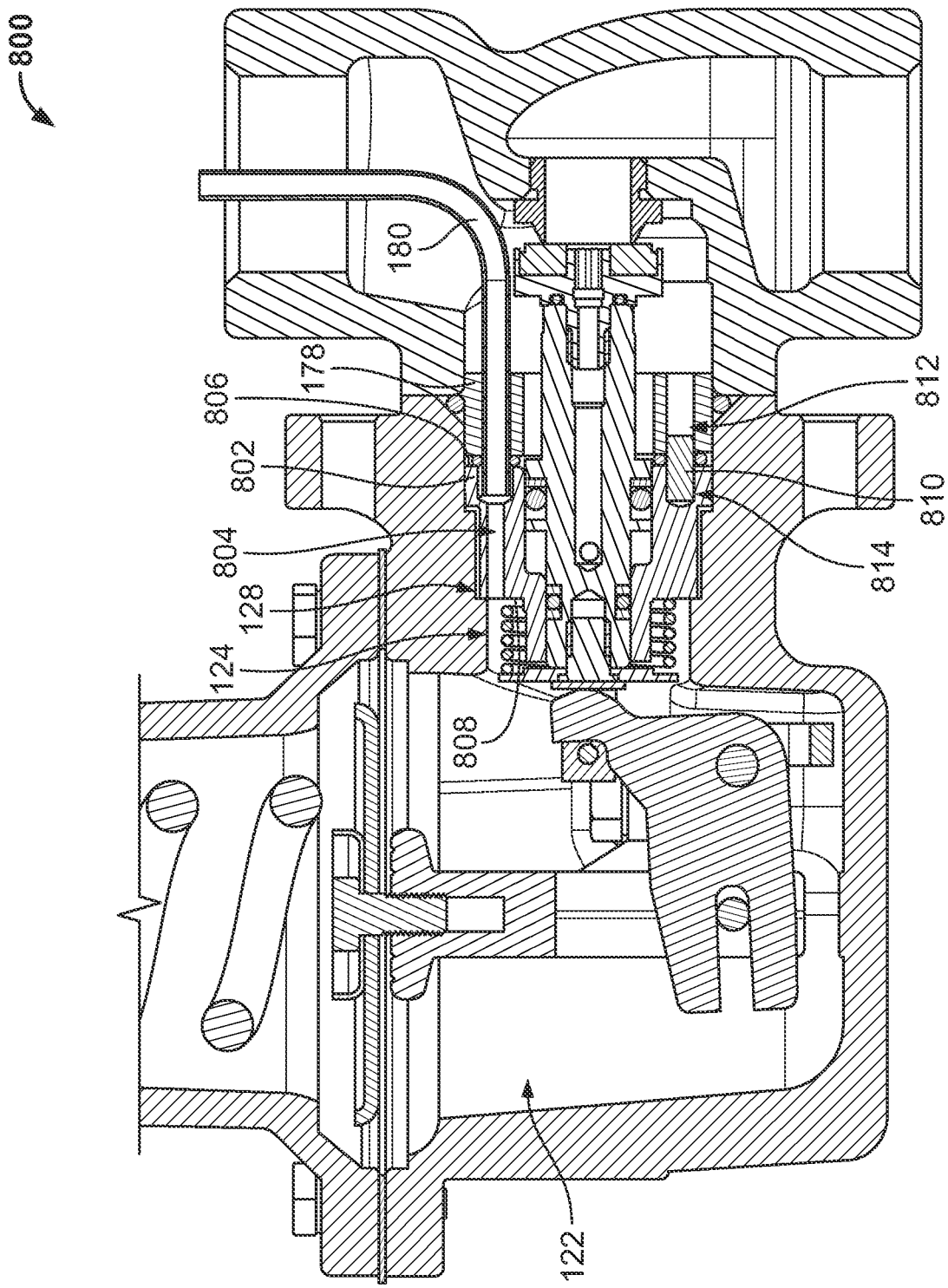
FIG. 8 is another example pressure regulator with an example pressure regulator having a different stem guide and boost body configuration.

FIG. 8 is a cross-sectional view of another example pressure regulator 800. The example pressure regulator 100 is similar to the example pressure regulator 100 disclosed above, and like parts will be given like numbers. However, in this example, the plug assembly 128 includes a stem guide 802 that is different than the stem guide 138 disclosed above. In this example, the stem guide 802 has one channel 804 between a first side 806 and a second side 808 of the stem guide 802. The tube 180 extends into the channel 804. As such, fluid from the tube 180 is routed through the stem guide 802 to the pressure sense chamber 122.

Figure 9:
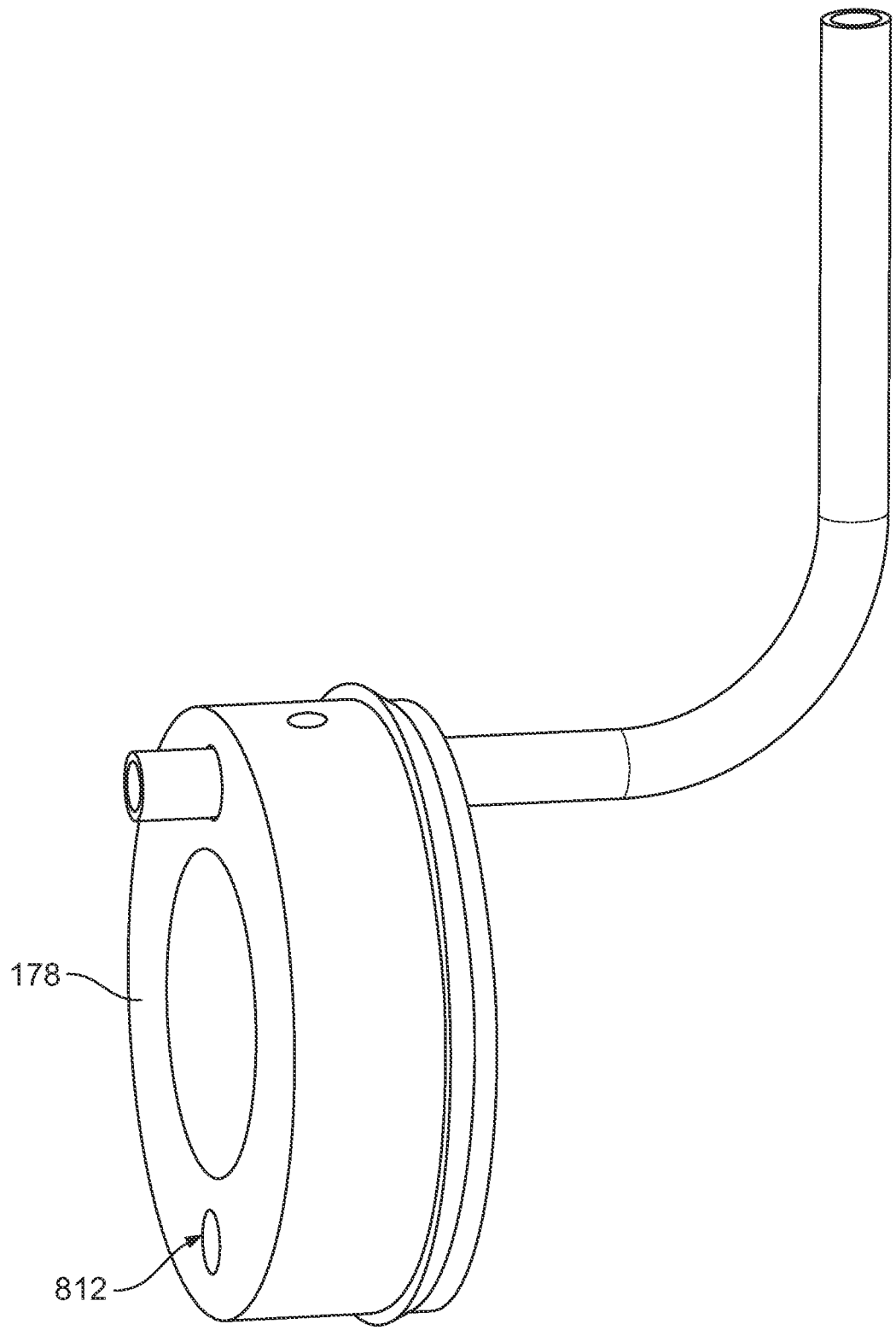
FIG. 9 is a perspective view of the example boost body and example tube of the example plug assembly of FIG. 8.

In the example of FIG. 8, the boost body 178 and the stem guide 802 are coupled by a pin 810. In particular, the boost body 178 has an opening 812, and the stem guide 802 has a bore 814. The pin 810 is disposed in the opening 812 of the boost body 178 and extends into the bore 814. As such, because both the tube 180 and the pin 810 extend into the stem guide 802, the boost body 178 and the stem guide 802 are rotationally locked. In other words, the boost body 178 is not rotatable relative to the stem guide 802 like the example of FIG. 1. Instead, to change the orientation of the tube 180, the entire plug assembly 128 can be removed from the channel 124, rotated, and then reinserted into the channel 124 in the desired orientation. FIG. 9 is a perspective view of the boost body 178 of FIG. 8 showing the opening 812 in the boost body 178.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, and articles of manufacture have been disclosed that provide a plug assembly with a relatively long pitot tube, which enables the pressure sense chamber to sense pressure further downstream of the valve. The examples disclosed herein also enable the tube to be reoriented based on the orientation of the valve body and actuator casing.

Examples and example combinations disclosed herein include the following:

Example 1 is pressure regulator comprising a valve body defining a fluid passageway between an inlet and an outlet, a seat in the fluid passageway, and an actuator casing coupled to the valve body. The actuator casing defines a pressure sense chamber and a channel between the pressure sense chamber and the fluid passageway in the valve body. The pressure regulator also comprises a plug assembly including a stem, a plug coupled to the stem, and a stem guide disposed in the channel of the actuator casing. The stem is moveable in the stem guide to move the plug relative to the seat. The stem guide has a first side facing the pressure sense chamber and a second side facing the fluid passageway. The stem guide has a flange with a notch. The plug assembly also includes a boost body on the second side of the stem guide and a tube extending through the boost body. The tube has a first end and a second end. The first end is aligned with the notch and the second end disposed in a downstream location relative to the seat such that the pressure sense chamber is in fluid communication with the downstream location. The boost body is rotatable with respect to the stem guide to position the tube in at least one other orientation relative to the actuator casing.

Example 2 includes the pressure regulator of Example 1, wherein the first end of the tube is disposed in the notch.

Example 3 includes the pressure regulator of Example 2, wherein the boost body is moveable away from the stem guide to move the first end of the tube out of the notch.

Example 4 includes the pressure regulator of any of Examples 1-3, wherein the flange of the stem guide has four notches, and wherein the boost body can be rotated to four positions to align the first end of the tube with a corresponding one of the notches.

Example 5 includes the pressure regulator of any of Examples 1-4, wherein the tube is curved to include a 90° turn.

Example 6 includes the pressure regulator of any of Examples 1-5, wherein the valve body has a first end forming the inlet and a second end forming the outlet, wherein the second end of the tube is located at or near the second end of the valve body.

Example 7 includes the pressure regulator of Example 6, wherein the second end of the tube extends beyond the second end of the valve body.

Example 8 includes the pressure regulator of any of Examples 1-7, further including a spring to bias the boost body toward the stem guide.

Example 9 includes the pressure regulator of claim 8, wherein the spring is between the boost body and the plug.

Example 10 includes the pressure regulator of any of Examples 1-9, wherein the tube is coupled to the boost body by a retaining pin.

Example 11 includes the pressure regulator of Example 10, wherein the tube extends through a channel in the boost body, the retaining pin is inserted into a bore that extends into a peripheral edge of the boost body, the bore partially intersecting the channel, and wherein the retaining pin partially flattens a portion of the tube.

Example 12 includes the pressure regulator of any of Examples 1-11, wherein the flange is a first flange, the stem guide having a second flange spaced from the first flange, the second flange engaged with an inner surface of the channel, second flange having a notch to enable fluid flow across the second flange.

Example 13 includes the pressure regulator of any of Examples 1-12, wherein the tube extends through a channel in the boost body, the tube and the channel dimensioned to form an interference fit.

Example 14 includes the pressure regulator of any of Examples 1-13, wherein the boost body is constructed of a compliant material, and the tube is constructed of metal.

Example 15 includes the pressure regulator of any of Examples 1-14, further including a seal between the stem guide and the boost body.

Example 16 is a plug assembly for a pressure regulator comprising a stem and a plug coupled to the stem. The plug is to be moved relative to a seat in the pressure regulator to control a flow of fluid through the seat. The plug assembly comprises a stem guide to be disposed in the pressure regulator between a fluid passageway and a pressure sense chamber. The stem guide has a first side to face the pressure sense chamber and a second side to face the fluid passageway. The stem guide has a flange with notches. The plug assembly also comprises a boost body on the second side of the stem guide and a tube coupled to and extending through the boost body and into a first one of the notches. The boost body is moveable away from the second side of the stem guide and rotatable relative to the stem guide to position the tube in another one of the notches.

Example 17 includes the plug assembly of Example 16, wherein the notches include four notches that are radially spaced around the flange.

Example 18 includes the plug assembly of Examples 16 or 17, further including a spring to bias the boost body toward the stem guide.

Example 19 includes the plug assembly of claim 18, wherein the spring is between the boost body and the plug.

Example 20 includes the plug assembly of any of Examples 16-19, wherein the tube includes a curved portion.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A pressure regulator comprising:
   a valve body defining a fluid passageway between an inlet and an outlet;
   a seat in the fluid passageway;
   an actuator casing coupled to the valve body, the actuator casing defining a pressure sense chamber and a channel between the pressure sense chamber and the fluid passageway in the valve body; and
   a plug assembly including:
   a stem;
   a plug coupled to the stem;
   a stem guide disposed in the channel of the actuator casing, the stem moveable in the stem guide to move the plug relative to the seat, the stem guide having a first side facing the pressure sense chamber and a second side facing the fluid passageway, the stem guide having a flange with a notch;

a boost body on the second side of the stem guide; and a tube extending through the boost body, the tube having a first end and a second end, the first end of the tube in the notch, the second end disposed in a downstream location relative to the seat such that the pressure sense chamber is in fluid communication with the downstream location, wherein the boost body is moveable away from the stem guide to move the first end of the tube out of the notch, and wherein the boost body is rotatable with respect to the stem guide to position the tube in at least one other orientation relative to the actuator casing.

2. The pressure regulator of claim 1, wherein the tube is curved to include a 90° turn.

3. The pressure regulator of claim 1, wherein the valve body has a first end forming the inlet and a second end forming the outlet, wherein the second end of the tube is located at or near the second end of the valve body.

4. The pressure regulator of claim 3, wherein the second end of the tube extends beyond the second end of the valve body.

5. The pressure regulator of claim 1, further including a spring to bias the boost body toward the stem guide.

6. The pressure regulator of claim 1, wherein the tube is coupled to the boost body by a retaining pin.

7. The pressure regulator of claim 1, wherein the tube extends through a channel in the boost body, the tube and the channel dimensioned to form an interference fit.

8. The pressure regulator of claim 1, wherein the boost body is constructed of a compliant material, and the tube is constructed of metal.

9. The pressure regulator of claim 1, further including a seal between the stem guide and the boost body.

10. A pressure regulator comprising:

a valve body defining a fluid passageway between an inlet and an outlet;

a seat in the fluid passageway;

an actuator casing coupled to the valve body, the actuator casing defining a pressure sense chamber and a channel between the pressure sense chamber and the fluid passageway in the valve body; and a plug assembly including:

a stem;

a plug coupled to the stem;

a stem guide disposed in the channel of the actuator casing, the stem moveable in the stem guide to move the plug relative to the seat, the stem guide having a first side facing the pressure sense chamber and a second side facing the fluid passageway, the stem guide having a flange with four notches;

a boost body on the second side of the stem guide; and a tube extending through the boost body, the tube having a first end and a second end, the first end aligned with the notch and the second end disposed in a downstream location relative to the seat such that the pressure sense chamber is in fluid communication with the downstream location, wherein the boost body is rotatable with respect to the stem guide to position the tube in at least one other orientation relative to the actuator casing, and wherein the boost body can be rotated to four positions to align the first end of the tube with a corresponding one of the notches.

11. A pressure regulator comprising:

a valve body defining a fluid passageway between an inlet and an outlet;

a seat in the fluid passageway;

an actuator casing coupled to the valve body, the actuator casing defining a pressure sense chamber and a channel between the pressure sense chamber and the fluid passageway in the valve body; and a plug assembly including:

a stem;

a plug coupled to the stem;

a stem guide disposed in the channel of the actuator casing, the stem moveable in the stem guide to move the plug relative to the seat, the stem guide having a first side facing the pressure sense chamber and a second side facing the fluid passageway, the stem guide having a flange with a notch;

a boost body on the second side of the stem guide;

a spring to bias the boost body toward the stem guide, wherein the spring is between the boost body and the plug; and a tube extending through the boost body, the tube having a first end and a second end, the first end aligned with the notch and the second end disposed in a downstream location relative to the seat such that the pressure sense chamber is in fluid communication with the downstream location, wherein the boost body is rotatable with respect to the stem guide to position the tube in at least one other orientation relative to the actuator casing.

12. A pressure regulator comprising:

a valve body defining a fluid passageway between an inlet and an outlet;

a seat in the fluid passageway;

an actuator casing coupled to the valve body, the actuator casing defining a pressure sense chamber and a channel between the pressure sense chamber and the fluid passageway in the valve body; and a plug assembly including:

a stem;

a plug coupled to the stem;

a stem guide disposed in the channel of the actuator casing, the stem moveable in the stem guide to move the plug relative to the seat, the stem guide having a first side facing the pressure sense chamber and a second side facing the fluid passageway, the stem guide having a flange with a notch;

a boost body on the second side of the stem guide; and a tube extending through a channel in the boost body, the tube coupled to the boost body by a retaining pin, the retaining pin is inserted into a bore that extends into a peripheral edge of the boost body, the bore partially intersecting the channel, wherein the retaining pin partially flattens a portion of the tube, wherein the tube has a first end and a second end, the first end aligned with the notch and the second end disposed in a downstream location relative to the seat such that the pressure sense chamber is in fluid communication with the downstream location, and wherein the boost body is rotatable with respect to the stem guide to position the tube in at least one other orientation relative to the actuator casing.

13. A pressure regulator comprising:

a valve body defining a fluid passageway between an inlet and an outlet;

a seat in the fluid passageway;

an actuator casing coupled to the valve body, the actuator casing defining a pressure sense chamber and a channel between the pressure sense chamber and the fluid passageway in the valve body; and a plug assembly including:
  a stem;
  a plug coupled to the stem;
  a stem guide disposed in the channel of the actuator casing, the stem moveable in the stem guide to move the plug relative to the seat, the stem guide having a first side facing the pressure sense chamber and a second side facing the fluid passageway, the stem guide having a first flange with a first notch, the stem guide having a second flange spaced from the first flange, the second flange engaged with an inner surface of the channel, the second flange having a second notch to enable fluid flow across the second flange;
  a boost body on the second side of the stem guide; and
  a tube extending through the boost body, the tube having a first end and a second end, the first end aligned with the first notch and the second end disposed in a downstream location relative to the seat such that the pressure sense chamber is in fluid communication with the downstream location, wherein the boost body is rotatable with respect to the stem guide to position the tube in at least one other orientation relative to the actuator casing.

14. A plug assembly for a pressure regulator, the plug assembly comprising:
  a stem;
  a plug coupled to the stem, the plug to be moved relative to a seat in the pressure regulator to control a flow of fluid through the seat;
  a stem guide to be disposed in the pressure regulator between a fluid passageway and a pressure sense chamber, the stem guide having a first side to face the pressure sense chamber and a second side to face the fluid passageway, the stem guide having a flange with notches;
  a boost body on the second side of the stem guide; and
  a tube coupled to and extending through the boost body and into a first one of the notches, the boost body being moveable away from the second side of the stem guide and rotatable relative to the stem guide to position the tube in another one of the notches.

15. The plug assembly of claim 14, wherein the notches include four notches that are radially spaced around the flange.

16. The plug assembly of claim 14, further including a spring to bias the boost body toward the stem guide.

17. The plug assembly of claim 16, wherein the spring is between the boost body and the plug.

18. The plug assembly of claim 14, wherein the tube includes a curved portion.

\* \* \* \* \*